(12) United States Patent
Turner

(10) Patent No.: US 12,317,865 B2
(45) Date of Patent: Jun. 3, 2025

(54) SPECIES ENVIRONMENT MEASUREMENT SYSTEM

(71) Applicant: Jeremy Turner, Jacksonville, IL (US)

(72) Inventor: Jeremy Turner, Jacksonville, IL (US)

( * ) Notice: Subject to any disclaimer, the term of this patent is extended or adjusted under 35 U.S.C. 154(b) by 408 days.

(21) Appl. No.: 17/556,833

(22) Filed: Dec. 20, 2021

(65) Prior Publication Data
US 2022/0192159 A1 Jun. 23, 2022

Related U.S. Application Data

(60) Provisional application No. 63/128,162, filed on Dec. 20, 2020.

(51) Int. Cl.
*G01H 3/00* (2006.01)
*A01K 29/00* (2006.01)

(52) U.S. Cl.
CPC ............ *A01K 29/005* (2013.01); *G01H 3/00* (2013.01); *A01K 2227/105* (2013.01)

(58) Field of Classification Search
CPC ............ A01K 29/005; A01K 2227/105; A01K 1/031; G01H 3/00
USPC ...................................................... 324/76.11
See application file for complete search history.

(56) References Cited

U.S. PATENT DOCUMENTS

| | | | | |
|---|---|---|---|---|
| 5,273,028 | A * | 12/1993 | McLeod ............ | A61H 23/0218 601/35 |
| 7,424,867 | B2 * | 9/2008 | Kates ................... | A01K 15/021 119/908 |
| 2005/0284405 | A1 * | 12/2005 | Pomakoy-Poole .. | A01K 1/0245 119/497 |
| 2007/0228703 | A1 * | 10/2007 | Breed ................... | B60R 21/232 280/740 |
| 2011/0126775 | A1 * | 6/2011 | Seltzer ................. | A01K 1/033 119/500 |
| 2017/0315804 | A1 * | 11/2017 | Frudakis ............... | G08B 13/18 |
| 2018/0053394 | A1 * | 2/2018 | Gersten ................. | G08B 17/08 |
| 2019/0215621 | A1 * | 7/2019 | Albahri ................ | H04R 25/405 |
| 2020/0068354 | A1 * | 2/2020 | Stapleford ............ | H04W 4/029 |

FOREIGN PATENT DOCUMENTS

WO WO-2017189608 A1 * 11/2017 ........... A61B 5/0205

OTHER PUBLICATIONS

Bedrosian, T. A., et al. "Behaviour of laboratory mice is altered by light pollution within the housing environment." Animal Welfare 22.4 (2013): 483-487. (Year: 2013).*

(Continued)

*Primary Examiner* — Christopher P McAndrew
(74) *Attorney, Agent, or Firm* — Law Offices of Robert M. Patino

(57) ABSTRACT

A vivarium measurement system for deployment in a vivarium environment and corresponding rooms that includes a microphone system, an at least one accelerometer in operational relationship to the microphone system, a data computational device that inputs data from the microphone system and the at least on accelerometer and wherein the data computational device comprises of a spectrum analyzer. The vivarium measurement system is optionally provided with an at least one alarm system that relays an alert when a threshold parameter is exceeded as determined by the spectrum analyzer.

6 Claims, 5 Drawing Sheets

(56) References Cited

OTHER PUBLICATIONS

Cui B, Wu M, She X. 2009. Effects of chronic noise exposure on spatial learning and memory of rats in relation to neurotransmitters and NMDAR2B alteration in the hippocampus. Journal of Occupational Health. 51: 152-158.
Davis MF. 2007. Audio and Electroacoustics. In Handbook of Acoustics. T.D. Rossing, Ed. pp. 743-778.
Gannouni N, Mhamdi A, Tebourbi O, El May M, Sakly M, Rhouma KB. 2013. Qualitative and quantitative assessment of noise at moderate intensities on extra-auditory system in adult rats. Noise Health. 15: 406-411.
Garner AM, Norton JN, Kinard WL, Kissling GE, Reynolds, RP. 2018. Vibration-induced behavioral responses and response thresholds in female C57BL/6 mice. Journal of the American Association for Laboratory Animal Science, 57(5), 447-455.
Grimsley JMS, Sheth S, Vallabh N, Grimsley CA, Bhattal J, Latsko M, Jasnow A, Wenstrup JJ. 2016. Contextual modulation of vocal behavior in mouse: Newly identified 12 kHz "Mid-Frequency" vocalization emitted during restraint. Frontiers of Behavioral Neuroscience, 10, 38.
Harding GW, Bohne BA. 2004 Temporary DPOAE level shifts, ABR threshold shifts and histopathological damage following below-critical-level noise exposures. Hear Res 196, 94-108.
Heffner HE, Heffner RS. 2007. Hearing ranges of laboratory animals. Journal of the American Association for Laboratory Animal Science: JAALAS, 46(1), 20-22.
Heinrich RR, Brieger J, Silvanova O, Feltens R, Elmemacher A, Schafer D, Mann WJ. 2006. COX-2 expression in the guinea pig cochlea partly altered by moderate sound exposure. Neuroscience Letters, 394(2), 121-6.
Hogan MC, Norton JN, Reynolds RP. 2018. Chapter 20 Environmental Factors: Macroenvironment versus Microenvironment. In Management of Animal Care and Use Programs in Research, Education, and Testing. 2nd Ed. Authors Weichbrod, RH, Thompson, GAH, and Norton, JN, Eds. CRC Press/Taylor & Francis.
Hughes L. 2007. The fundamentals of sound and its measurement. Journal of the American Association for Laboratory Animal Science. 46 (1), 14-19.
Hurst K, Litwak KN. 2012. Accelerative forces associated with routine in-house transportation of rodent cages. Journal of the American Association for Laboratory Animal Science: JAALAS, 51(5), 544.
International Organization for Standardization (ISO) 1997. Guide to the evaluation of human exposure to whole-body mechanical vibration and shock. ISO 2631-1:1997.
Ison JR, Allen PD. 2003. Low-frequency tone pips elicit exaggerated startle reflexes in C57BL/6J mice with hearing loss. Journal of the Association for Research in Otolaryngology, 4(4), 495-504.
Kobrina A, Toal KL, Dent ML. 2018. Intensity difference limens in adult CBA/CaJ mice (Mus musculus). Behav Processes, 148, 46-48.
Lauer AM, May BJ, Hao ZY, Watson J. 2009. Analysis of environmental sound levels in modern rodent housing rooms. Lab Animal, 38(5), 154-160.
Li Y, Rabey KN, Schmitt D, Norton JN, Reynolds RP. 2015. Characteristics of vibration that alter cardiovascular parameters in mice. Journal of the American Association for Laboratory Animal Science: JAALAS, 54(4), 372.
Logge W, Kingham J, Karl T. 2014. Do individually ventilated cage systems generate a problem for genetic mouse model research? Genes, Brain and Behavior, 13(7), 713-720.
Morioka M, Griffin MJ. 2000. Difference thresholds for intensity perception of whole-body vertical vibration: effect of frequency and magnitude. Journal of the Acoustical Society of America, 107, 620-624.
Murphy TJ, Rienstra AA. 2012. Hear More: A Guide to Using Ultrasound for Leak Detection and Condition Monitoring. Terence O'Hanlon Publishers. ISBN 978-0-9825-1633-1.

National Institutes of Health Design Requirements Manual 2016. Issuance Notice Dec. 12, 2016) Rev. 1.0: Feb. 13, 2018 Accessed Nov. 18, 2018: https://www.wbdg.org/FFC/NIH/nih_design_requirements_rev_1.0_2018.pdf.
National Research Council (NRC). 2011. Guide for the Care and Use of Laboratory Animals: Eighth Edition. Washington, DC: The National Academies Press. doi: 10.17226/12910.
Norton JN, Kinard WL, Reynolds RP. 2011. Comparative vibration levels perceived among species in a laboratory animal facility. Journal of the American Association for Laboratory Animal Science, 50(5), 653-659.
Obernier JA, Baldwin RL. 2006. Establishing an appropriate period of acclimatization following transportation of laboratory animals. ILAR journal, 47(4), 364-369.
Perremans S, Randall JM, Rombouts G, Decuypere E, Geers, R. 2001. Effect of whole-body vibration in the vertical axis on cortisol and adrenocorticotropic hormone levels in piglets. Journal of animal science, 79(4), 975-981.
Pienkowski M, Eggermont JJ. 2012. Reversible long-term changes in auditory processing in mature auditory cortex in the absence of hearing loss induced by passive moderate-level sound exposure. Ear & Hearing, 33(3), 305-314.
Pienkowski M, Munguia R, Eggermont JJ. 2013. Effects of passive, moderate-level sound exposure on the mature auditory cortex: spectral edges, spectrotemporal density, and real-world noise. Hearing Reearch, 296, 121-30.
Popelar J, Diaz Gomez M, Lindovsky J, Rybalko N, Burianova J, Oohashi T, Syka J. 2017. The absence of brain-specific link protein Bral2 in perineuronal nets hampers auditory temporal resolution and neural adaptation in mice. Physiological Research, 66(5), 867-880.
Portfors CV, Perkel DJ. (2014). The role of ultrasonic vocalizations in mouse communication. Current Opinions in Neurobiology, 28, 115-120.
Rabat A. 2007. Extra-auditory effects of noise in laboratory animals: The relationship between noise and sleep. JAALAS. 46, 35-41.
Rabey KN, Li Y, Norton JN, Reynolds RP, Schmitt D. 2015. Vibrating frequency thresholds in mice and rats: implications for the effects of vibrations on animal health. Annals of biomedical engineering, 43(8), 1957-1964.
Raff H, Bruder ED, Cullinan WE, Ziegler DR, Cohen EP. 2011. Effect of animal facility construction on basal hypothalamic-pituitary-adrenal and renin-aldosterone activity in the rat. Endocrinology, 152(4), 1218-1221.
Rassmussen S, Glickman G, Norinsky R, Quimby FW, Tolwani RJ. 2009. Construction noise decreases reproductive efficiency in mice. J Am Assoc Lab Anim Sci, 48(4), 363-370.
Reynolds RP, Kinard WL, Degraff JJ, Leverage N, Norton JN. 2010. Noise in a laboratory animal facility from the human and mouse perspectives. J Am Assoc Lab Anim Sci, 49(5), 592-597.
Reynolds RP, Li Y, Garner A, Norton JN. 2018. Vibration in mice: A review of comparative effects and use in translational research. Animal Model Exp Med, 1(2), 116-124.
Sales GD, Wilson KJ, Spencer KV, Milligan SR. 1988. Environmental ultrasound in laboratories and animal houses: A possible cause for concern in the welfare and of laboratory animals. Lab Animals. 22, 369-375.
Samson J, Sheeladdevi R, Ravindran R, Senthilvelan M. 2006. Stress responses in rat brain after different durations of noise exposure. Neuroscience Research. 57, 143-147.
Schwarting RKW, Wohr M. 2012. On the relationships between ultrasonic calling and anxiety-related behavior in rats. Brazilian Journal of Medical & Biological Research, 45(4).
Silva MJ, Dias A, Barreta A, Nogueira PJ, Castelo-Branco, N. A. A., & Boavida, M. G. 2002. Low frequency noise and whole-body vibration cause increased levels of sister chromatid exchange in splenocytes of exposed mice. Teratogenesis, carcinogenesis, and mutagenesis, 22(3), 195-203.
Skellett RA, Crist JR, Fallon M, Bobbin RP. 1996. Chronic low-level noise exposure alters distortion product otoacoustic omissions. Hear Res. 98, 68-76.

(56) References Cited

OTHER PUBLICATIONS

Smith MG, Croy I, Ögren M, Waye KP. 2013. On the influence of freight trains on humans: a laboratory investigation of the impact of nocturnal low frequency vibration and noise on sleep and heart rate. PloS one, 8(2), e55829.

Turner JG, Bauer CA, Rybak LP. 2007. Noise in animal facilities: why it matters. J Am Lab Anim Sci, 46(1), 10-13.

Turner JG, Parrish JL, Hughes LF, Toth LA, Caspary DM. 2005. Hearing in laboratory animals: strain differences and nonauditory effects of noise. Comp Med, 55(1), 12-23.

Turner JG, Willott JF. 1998. Exposure to an augmented acoustic environment alters auditory function in hearing-impaired DBA/2J mice. Hear Res, 118, 101-113.

Turner JG, Parrish JL, Zuiderveld L, Darr S, Hughes LF, Caspary DM, Idrezbegovic E, Canlon B. 2013. Acoustic experience alters the aged auditory system. 34(2), 151-159.

U.S. Environmental Protection Agency (EPA). 1974. Information on Levels of Environmental Noise Requisite to Protect Public Health and Welfare with an Adequate Margin of Safety. Available: http://www.nonoise.org/library/levels74/levels74.htm [accessed Nov. 11, 2018].

World Health Organization (WHO). 2018. Environmental noise guidelines for the European Region. ISBN: 9789289053563.

Whitmer WM, McShefferty D, Akeroyd MA. (2016). On detectable and meaningful speech-intelligibility benefits. Adv Exp Med Bio, 894, 447-455.

\* cited by examiner

ACTIVITIES

CLICK ON ALL ACTIVITIES WHEN ENTERING ROOM,
AN UNCLICK WHEN LEAVING

CAGE CHANGES

FOOD/H2O/HEALTH

CLEANING

BREED/WEAN

PROCEDURES

OTHER

SPECIES ENVIRONMENT MEASUREMENT SYSTEM

BACKGROUND

Noise, ultrasonic noise (sounds above 20 kHz not audible to humans but audible to our research animals), and vibration are ubiquitously present but seldom measured in our research animal vivarium and laboratory environments. As such they represent largely uncontrolled, unmeasured, and unrecognized confounds, even animal welfare concerns/stressors, that add variability to our work and impact animal welfare. As a result, noise, ultrasonic noise, and vibration are "silent" threats to research animals and a confounding variable impacting the quality of our research. The problem is perhaps even greater when the vast majority of animals used in research are mice and rats, which are nocturnal, tunnel-dwelling species that have evolved to rely more heavily on their senses of hearing and touch/vibration.

The Guide for the Care and Use of Laboratory Animals mentions the problems of noise and vibration in the animal facility 39 and 28 times, respectively. The Guide effectively warns stakeholders (facility managers, technicians, veterinarians, and scientists) that noise and vibration in the research animal facility space can be stressors for research animals and can cause potential confounds for the research studies the animals are involved in. However, the Guide offers limited guidance on how to manage noise and vibration concerns, how/whether such variables should be measured, and provides no hard information about what levels or ranges of noise and vibration are normal or acceptable in the vivarium. Another resource sometimes used by research facilities, but which focuses more on concerns related to construction, is the US National Institutes of Health Design Requirements Manual (DRM). The DRM also notes the adverse effects of noise and vibration on lab animals, and helps inform all stakeholders regarding key issues during the design, construction, and commissioning of spaces. The DRM suggests that vivarium environments remain below NC45, in an empty room with no equipment or animals. However, the NC (noise criterion or noise rating curve) measure of room noise is designed for human hearing only, overemphasizing sounds in the human speech frequency range and only concerned with sounds between 63-8,000 Hz. As such, NC45 offers very little value for understanding how such noise levels are related to what research animals might hear. The DRM also notes that when animals are present and if ventilated caging or other equipment is used, the acoustical consultant and head veterinarian decide how loud is too loud on a per-project basis. And for vibration, the DRM lists no specific levels to avoid for animals (other than a standard for structural velocity of floors), instead noting that animals are very sensitive to vibration, that rooms housing animals should have low noise and vibration tolerances, and that researchers should be consulted regarding vibration levels acceptable to animals.

The problem of noise and vibration is compounded by the fact that every year we introduce more and more electronic and mechanical equipment into the vivarium and procedure spaces. While new technology can help to solve some problems, such as ventilated caging systems helping to control odor and air particulates, such technology can sometimes simultaneously introduce potential new sources of noise, ultrasonic noise, and vibration. As a result, the problems associated with noise, ultrasonic noise, and vibration in the vivarium and animal research environment are of increasing concern and constantly evolving as new equipment enters the vivarium and research laboratory. Furthermore, this problem can extend to zoos and other environments where animals, including humans can be studied.

People charged with caring for research animals are left with limited information about how to deal with noise and vibration concerns, what to measure, why measure it, how to measure it, and what levels to avoid. As such, there is a need to manage the many problems associated with noise and vibration in the vivarium. There is also a need to have a system that can assist in managing a series of noise and vibration practices that can provide guidance for facility management and other stakeholders (e.g., funding agencies, construction personnel, equipment manufacturers and managers, administrators, veterinarians, technicians, scientists, and IACUCs) until such time that the research literature and/or other resources can provide more definitive guidelines.

SUMMARY OF THE INVENTION

The species environment measurement system shall also be referred to as a vivarium measurement system. The present vivarium measurement system addresses the issues identified above. A vivarium measurement system for deployment in a vivarium environment and corresponding rooms that includes a microphone system, an at least one accelerometer in operational relationship to the microphone system, a data computational device that inputs data from the microphone system and the at least on accelerometer and wherein the data computational device comprises of a spectrum analyzer. The vivarium measurement system is optionally provided with an at least one alarm system that relays an alert when a threshold parameter is exceeded as determined by the spectrum analyzer. The present vivarium measurement system is useful not just in animal research vivariums but may also be employed in zoos and clinical settings, such as a hospital. The vivarium measure system can monitor any environment where environmental variables are present such as neonatal intensive care units, industrial settings where multiple sensors (including ultrasound) can be used to trigger alerts by sensing liquid leaks, temperature or humidity spikes, and other disturbances.

DESCRIPTION OF THE DRAWINGS

FIG. 4a represents a screen shot of a logging mechanism.

FIG. 4b represents an artist's illustration of how the program in 4a can behave.

Figure 5a represents a screen shot of a spectrum analyzer.

FIG. 5b represents an artist's illustration of a spectrum analyzer.

DETAILED DESCRIPTION OF THE INVENTION

Figure 1:
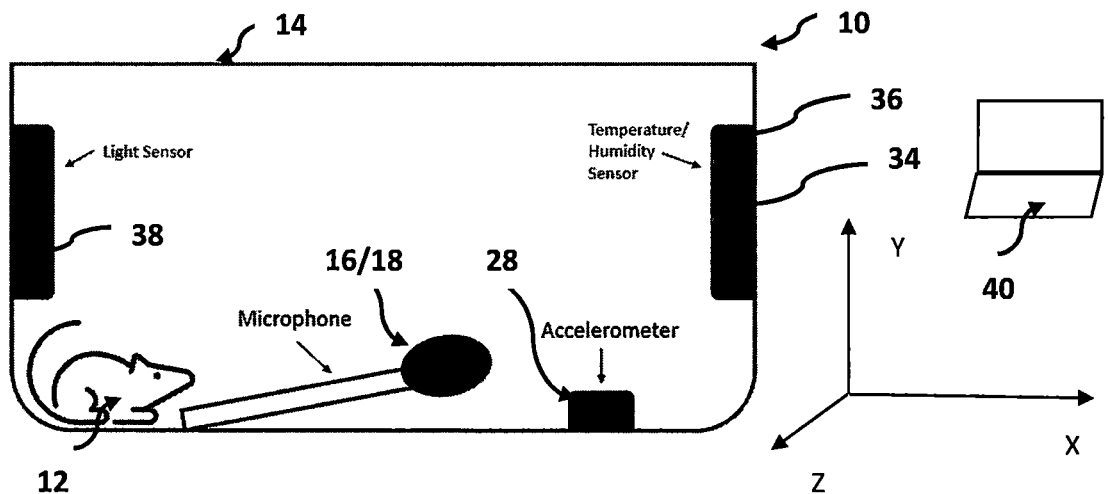
FIG. 1 is an illustration of where some of the measurement devices or sensors for measuring the environment are resideable in a cage or vivarium setting.
Figure 2:
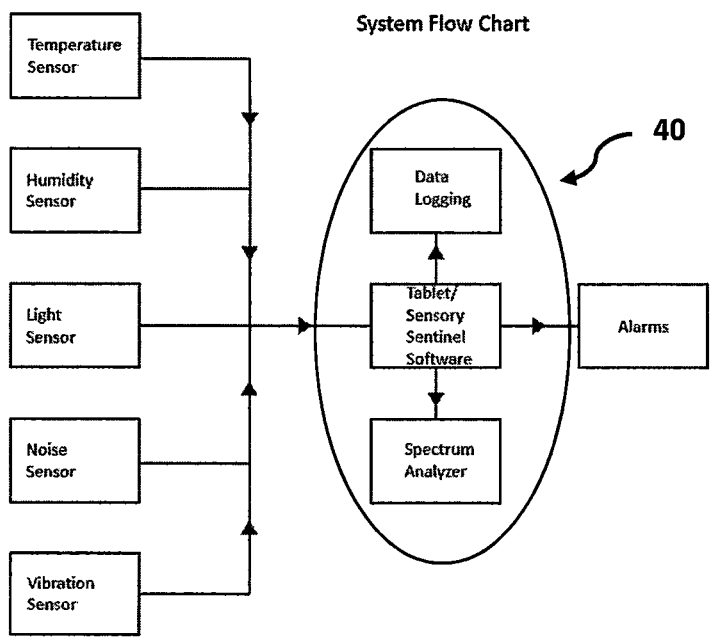
FIG. 2 is an outline of how data are gathered from the sensors and processed for analysis and alarm consideration.

The recommended practices described herein are examples of mechanisms that are employable by the present invention and are described generally as the 4 items in Table 1. These recommended practices are conservative, and facilities should generally have little problem achieving these standards with minimal resources and planning. It should be understood that these guidelines may be modified as future studies might reveal that even lower levels of noise or vibration are desirable based on either new research or the model/species-specific needs of the studies at a particular site.

TABLE 1

Recommended Practices (PACT) for Minimizing Negative Effects on Research Animals, Ongoing Research Studies, and Relationships with Scientists

| | |
|---|---|
| 1. | Plan. Facilities should maintain a written, comprehensive noise & vibration measurement, training, communication, and action plan. |
| 2. | Annual Assessment. Facilities should conduct an annual comprehensive noise and vibration assessment. |
| 3. | Changes. Facilities should conduct additional monitoring/measurements when changes in the animals are observed (e.g., breeding problems) or when the vivarium itself changes (e.g., construction or introduction of new equipment.) |
| 4. | Thresholds. Thresholds of concern for animal welfare for chronic noise and vibration in the animal's cage/microenvironment should minimally be set to 70 dB for noise and 0.05 g for vibration, recognizing that much lower levels of either noise or vibration can still disrupt more sensitive species, models, or assays. |

Plan requires that facilities should maintain a written noise and vibration measurement, training, communication, and action plan. A written noise and vibration measurement, training, communication, and action plan need not be exhaustive but it should briefly articulate the institution's position on staff training with regard to noise and vibration levels, how to recognize and limit problems, how and what measurements are collected, and how and when those measurements are communicated to stakeholders. Having such a plan can promote open communication during normal operations of the facility and especially during the more stressful times associated with disease outbreak, construction, or equipment upgrades.

Developing a written plan for how to deal with noise and vibration issues helps to create a climate of care and attention to these important variables, and helps to recognize noise and vibration as variables deserving of attention from the institution on par with others that are known to disrupt or harm animals, such as floods, viral outbreaks, etc. In addition to defining what is measured, when, and by whom, the plan should recognize that much of the noise and vibration in the vivarium, based upon our measurements in animal facilities, is caused by personnel during normal vivarium operations (cage changing, cleaning, procedures in the room, carts, etc.), and should therefore include some annual training on the impacts of noise and vibration on research animals. In addition, the plan should recognize that noise and vibration concerns become most intense during construction or renovation projects, which typically produce high levels of noise and vibration that could impact animals, disrupt ongoing studies, and strain relationships between scientists, animal facility staff, administration, and construction personnel. Such construction projects are often blamed (appropriately or not) whenever through the course of the construction any changes are observed in animal behavior or breeding, or when the researcher's studies simply do not work out as expected. In order to minimize construction-related noise and vibration effects on animals and ongoing studies and to maintain strong relationships with researchers, the construction process should be managed very carefully. Developing a training, communication, and action plan for facility administrators, veterinarians, technicians, and scientists will minimize the effects of noise and vibration on animals and ongoing studies, set a standard for better communication between all stakeholders, and avoid misunderstanding and unwarranted concern or confusion.

Implementing a communication plan for normal day-to-day operations is advisable but is absolutely critical during times of disease outbreak, new equipment installation, or during construction because at such times stress levels of workers, administrations, and scientists can reach new heights. Such a plan can help to maintain open lines of two-way productive communication, ensure that the critical importance of health and welfare of the animals and the quality of the ongoing science is recognized by the facility and administrators, and help to prevent miscommunication.

Although development of a master template plan for facilities to use has some appeal, such an undertaking is complicated by the fact that every facility has different needs, different species, different kinds of research being conducted, different problems, different personalities, different administrative structures, and different histories. However, to aid facilities in their attempts to develop such a written plan, some key features of such a plan are provided in Table 2.

TABLE 2

Recommended Features of a Noise and Vibration Measurement, Training, Communication, and Action Plan

| | |
|---|---|
| 1. | Describe what individual(s) or group is in charge of developing and managing the plan, as well as the relevant stakeholders. |
| 2. | Describe what information or training on noise & vibration is provided to staff and/or scientists. |
| 3. | Describe the program's measurement plan. Describe who will be conducting the measurements, what will be measured, and how/whether those measures will be shared with PIs, administrators, construction team |
| 4. | Describe how the measurements will inform any relevant mitigation steps, and what findings will prompt what actions (placing vibration mats under racks, moving animals, etc.). |

TABLE 2-continued

Recommended Features of a Noise and Vibration Measurement, Training, Communication, and Action Plan

| | |
|---|---|
| 5. | Describe what animal behavioral and health observations will prompt measurements. |
| 6. | Describe what construction/renovation actions will prompt measurements. |
| 7. | Describe when key stakeholders will be alerted to noise and vibration levels of concern (e.g., construction point person, veterinarian, the scientist's whose animals are impacted) |
| 8. | For construction specifically, note what preventative measures will be taken to isolate the noise or vibration to the source, what construction practice modifications could be made IF required by the measurements to minimize spread to the animal spaces, and what practices in the vivarium can be employed if noise or vibration reaches unacceptable threshold levels. Clearly identify beforehand if and when construction will be stopped due to noise and vibration concerns in the animal facility, and what person or group is responsible for this decision. |

The primary purpose for this annual assessment is to periodically review the written Plan (#1 above) and to consider whether noise and vibration concerns have emerged in the facility in the last year, and if so, what could be done to address them. This annual assessment could take many forms depending on the scope of the institution, its history of noise and vibration complaints/concerns, and its resources. Some facilities might opt to conduct a thorough annual noise and vibration measurement to provide an annual "check up" of the facility. Others might elect to simply review their noise and vibration plan and consider whether any changes need to be made to their Plan based upon the year's experiences. Annual assessments could include measurements from the macroenvironment and sample measurements from the cage-level microenvironment to determine which macroenvironmental noises and vibrations are reaching the animal's microenvironment. Ideally, such measurements could also be made in areas the animals experience during transit and in laboratory spaces where animals are taken for procedures/testing, as procedural and testing spaces often contain different sources of noise, ultrasonic noise and vibration (e.g., computers, lab testing equipment, ultrasonic mixers, ultrasonic motion sensors).

If annual noise and vibration measurements are collected as part of the assessment, there is a potential dual benefit in that, in addition to telling us what animals are hearing and feeling, also, this would allow tracking of the mechanical health of aging equipment and components, which can cause the production of more noise, ultrasonic noise and vibration. Industrial settings routinely make use of noise, ultrasonic noise and vibration measurements from equipment to serve as predictors of mechanical faults. This process is called condition monitoring and is routinely used in industrial settings to measure the mechanical health of equipment and conduct data-driven, planned maintenance and/or replacement of key components (pumps, blower motors, compressed gas leaks, etc.) in order to prevent the energy loss, downtime, and expense that comes with equipment failure.[26] For example, computers, test equipment, fluorescent lighting ballasts, and any equipment with a blower motor in the vivarium (ventilated caging, cage changing hoods) can generate greater noise, ultrasonic noise, and vibration as they age and components begin to fail. Observed changes in animals themselves could include changes in breeding, behavior suggestive of the presence of a stressor, changes in the general health of lab animals, or changes reported by PIs in their study results that might be the product of an environmental stressor. Intentional changes introduced to the vivarium itself might include the introduction of new equipment to the vivarium or a renovation/construction project. While it is important to monitor and mitigate noise and vibration levels experienced by animals during any significant renovation/construction process, consideration of noise and vibration should ideally be part of all phases of the construction process, from planning and design, to the choice of equipment and other materials, through the completed commissioning phases of the project to ensure that the new space is appropriate for habitation by research animals with respect to noise and vibration levels.

Table 3 summarizes the key noise and vibration thresholds of concern, as well as some key features of measurement to keep in mind.

TABLE 3

Key Noise & Vibration Thresholds of Concern And Measurement Details

| Noise | Vibration |
|---|---|
| ≥70 dB SPL Chronic Noise Level *note that lower level signals ≥45 dB SPL might be disruptive to more sensitive models Set low and high-end frequency filters to the hearing range of the species being studied. Use a measurement system capable of processing signals in the range of the filter settings for the animal being studied. Report unweighted measurements in dB SPL (re 20 uPa). Do not use human A-weighted measurements. Report whether sound is measured as instantaneous levels or time-weighted averages. | ≥0.05 g RMS Chronic Vibration Level *note that lower level signals ≥0.025 might be disruptive to more sensitive models and breeding animals, so this level would be recommended for such situations. Set low and high-end frequency filters to encompass the vibration range of the species being studied (2-500 Hz setting should normally be sufficient work). Report vibration in acceleration (not displacement or velocity) using either g or m/s/s (1 g = 9.81 m/s$^2$). Report whether vibration is measured in peak, peak-to-peak, or RMS and whether it is measured in the x, y, z or all 3 axes. |

Noise levels inside the cage should be maintained below 70 dB SPL. Summaries on the problem of noise in the vivarium have been published elsewhere.[48, 49] Noise levels in the vivarium will vary dramatically depending upon many factors, including the type of equipment used. Ventilated caging blower motors, as an example, can produce considerable noise, as can normal room ventilation, cage changing stations, and other equipment such as fluorescent lights and computers. Static caging rooms would typically expect to show much lower levels of background noise due to the relative lack of equipment producing noise and vibration. Thus, we have observed some of the most modern animal housing rooms with continuous, 24-hr background noise levels at or near 60 dB, due to ventilated caging blower motors and intermittent sound levels created by personnel in the room can be much louder than that.[22] For example, the act of snapping lids onto cages or connecting ventilated cages to a rack can produce intensities easily in the 85-100 dB SPL range; this level of noise is easily loud enough to produce an acoustic startle reflex in the animals inside or near the cage, as startle thresholds for mice and rats occur around 75-80 dB SPL.[20, 34]

Independent of potentially stress-inducing short duration noise or vibration occurrences in the vivarium, continuous noise levels of 70 dB or greater could be expected to affect animals in a range of ways. For example, this level of background noise might mask vocalizations or other communications among animals. Although the Guide notes that noise levels of 85 dB can have wide ranging effects on hearing and non-auditory stress pathways, the 85 dB level is based on research designed to determine acceptable noise exposure for people in a typical 8-hr human workday; applying that standard to a 24-hr exposure period of a research animal is not appropriate. Indeed, the U.S. Environmental Protection Agency (EPA) recommends that humans maintain a 24-hr noise exposure average of less than 70 dB to avoid hearing loss.[52] The World Health Organization (WHO) confirmed and adopted the EPA's 24-hr noise exposure threshold of 70 dB in 1999,[5] and more recently re-confirmed that limit by conducting a comprehensive review of the human and animal research data.[53] Both the EPA and WHO have also recognized that chronic exposure to levels of noise much lower than this 70 dB level, around 45-55 dB, does not cause hearing loss but can have significant negative effects on a range of health metrics, largely on sleep and cardiovascular systems.[5, 52, 53]

Additional evidence from the laboratory animal hearing research field has demonstrated that chronic exposure to 70 dB SPL noise can affect auditory structures and functions ranging from the cochlea to the cortex, with changes in molecular and anatomical systems and implications for functional outcomes for behavioral and electrophysiolocial responses to sound.[3, 15, 32, 33, 50] Some evidence further indicates that such low-level, 70 dB noise effects can also be complicated by sex-specific effects.[51]

In addition to the direct effects on the auditory system, noise exposure (even sometimes at the low level of 70 dB) can activate a cascade of stress responses in animals, resulting in changes in many organ systems, including changes in reproductive efficiency.[39, 49] The resulting widespread biological and behavioral effects have the potential to influence virtually every area of biomedical research, ranging from immune system function and sleep/wake cycle disturbances to cancer and cardiovascular disease.[4,10, 36, 39, 42, 53] These non-auditory effects of noise are often unrecognized by researchers, technicians, and veterinarians and could represent a source of distress for animals and a potential design confound for many experiments.[42] Even at relatively low intensities, such noise can be damaging to research animals and humans alike. For example, a thorough review of animal and human data reported that environmental noise levels as low as 45 dB (especially while asleep) and in the range from 45-60 dB are associated with increased risk of a number of health concerns, including cardiovascular disease and hypertension.[53] Decades of human and animal research have demonstrated that sub-critical noise levels can produce a variety of negative health effects due to the activation of stress pathways.[4, 43] In addition, a variety of negative consequences of noise including sleep disturbances, cardiovascular stress, and learning and memory impairments can occur.[6, 7, 8, 10, 13, 36, 46]

Noise in the ultrasonic range (>20 kHz) is not audible to humans. However, for many species of research animals, thresholds are near 0 dB for hearing ultrasonic noise in the 20-40 kHz range. Ultrasonic noise can therefore cause both animal stress and a serious experimental confound. Ultrasound noise above 20 kHz should be kept to at least below 45 dB SPL in order to minimize masking of vocalizations/communications and to limit its potential to disrupt sleep. Certain ultrasound frequencies can have different effects on different species. For example, sound energy in the 18-37 kHz range provides an anxiety-related aversion call frequency range in a rat, whereas higher frequency ultrasonic calls in the 40+kHz range serve appetitive, mating, and other pro-social interactions.[44] Although mouse vocalizations are less well understood and are perhaps more complex and context-dependent, lower-frequency ultrasonic vocalizations may signal aversive or threatening events and higher frequency vocalizations may aid social communication.[12, 35]

The laboratory environment generally contains many sources of ultrasonic noise, emanating from lighting, computers and other test equipment, and potentially having a negative influence on the animals or the tests being performed. As an example, consider a classic behavioral test in the learning and memory research field—the Morris Water Maze. In the Morris Water Maze, researchers work diligently to control all possible extraneous variables, such as light, orientation, and general visual cues. However, ultrasonic noise may serve as an invisible cue during training or testing. Because ultrasonic noise is highly directional in nature, it is reasonable to assume that rats and mice can localize this type of noise, which is often produced by laboratory test equipment, computers, lights, and cameras, to provide a directional cue aiding their navigation in the maze. Moreover, because ultrasonic noise levels can vary both within and among laboratories, effects on animals are unpredictable and can cause inconsistent and irreproducible effects on data collected.

Vibration levels inside the cage should be maintained below 0.05 g (RMS; see below) Note that vibration can occur in the x, y, or z axes and can be measured in all three axes or the greatest of the three. Experiments show that most animal facility vibration reaching animals is in the z (vertical) axis. Recent work has identified the levels of vibration that are perceptible to rats and mice[11, 29, 37] and thereby potentially capable of causing significant biological and behavioral impacts on research animals. Perhaps the most commonly reported finding in the vibration literature are elevated corticosterone levels.[1, 2, 31, 38] At magnitudes as low as ~0.1-0.3 g, fetal pigs showed a significant increase in plasma cortisol and adrenocorticotropin hormone levels,[31] and vibration levels of only ~0.025 g have been shown to increase fecal corticosterone metabolites in female (but not male) mice,[2] and to result in overt behavioral responses in female mice indicative of arousal.[11] In addition to stress systems, many secondary systems are in turn affected by chronic exposure to vibration as a result of the stress response. The effects of vibration can be observed in disturbances of sleep, changes in cardiovascular function, and even decreased pregnancy rates.[2, 23, 47]

In addition to the concern that chronic vibration presents a chronic stressor to research animals, vibration can also create an experimental confound by introducing unknown variability into research studies. Several studies have found significant biological and behavioral changes in animals exposed to chronic vibration.[30, 45] Furthermore, different species and strains may react differently to a given level of vibration, and levels of vibration may vary from cage to cage, rack to rack, and room to room, thus introducing variability within and across studies. Human standards for vibration preceded animal standards and research. International Organization for Standardization (ISO)[19] sets an action level for vibration for an 8-hour work day at ~0.05 g (0.5 m/s$^2$); the standard describes vibration in the ~0.05-0.1 g (0.5-1 m/s$^2$) range as "fairly uncomfortable", and levels over ~0.08 g (0.8 m/s$^2$) as "uncomfortable". While no current standards exist for vibration in animal facilities, the ~0.05 g (0.5 m/s$^2$) action level is likely a very conservative limit. Furthermore, as noted earlier, vibration accelerations at half of that level, as low as 0.025 g, could be potential stressors for animals and confounding factors for research, especially for species, strains and models that might be more sensitive.

In the assessment of noise and vibration levels, an important concept is that normal day-to-day personnel activity in the vivarium will typically generate many times the noise and vibration than is produced by typical construction activities. For example, the simple act of connecting a cage to a ventilated rack can easily generate startle-inducing 85 dB SPL bursts of noise, and vibration levels around 0.35 g, many times greater than the recommended lower limits. Similarly, animals being transported from a vendor or between locations on a cart can experience high levels of noise and vibration.[18] These handling-related noise and vibration exposures, together with other noise and vibration related to daily care, are likely to produce the greatest sources of noise and vibration experienced by animals. Furthermore, these levels are likely to be many times greater than any noise and vibration produced by construction activities at a facility, which are often viewed as a major concern. Also, the fact that a noise or vibration is felt or heard in the hallway by a human does not mean that the signals are in the range of detection of the animals or are reaching the animal's microenvironment.

Finally, even if these signals do reach the home cage, research animals, like humans, have what is known as a just noticeable difference (JND), which is the lowest change in the stimulus that is reliably detectable. While these levels can be lower in highly controlled experimental situations, for more complex real-world purposes, the JND (sometimes measured as the intensity difference limen) for noise is approximately 3 dB,[21, 54] and for vibration it is approximately a 10% increase from the background vibration.[25] Thus, any activities, such as construction, that do not generate an increase in the cage-level microenvironment of 3 dB for noise or a 10% increase for vibration, might just be barely detectable, if at all, by the animals, and can likely be considered benign. However, just because a stimulus is barely detectable does not mean it is meaningful, or that it causes problems. So individual facilities should use these values with interpretive caution as it is likely that levels well beyond these minimum JND threshold levels would be needed to create a meaningful difference in the background that activates stress pathways or otherwise disrupts animals. Additional research is needed before more definitive statements can be applied to this JND standard.

A critical feature of noise measurement in both the macroenvironment (e.g., hallways, center of vivarium room, outside cages) and microenvironment (inside cages) is that the microphone system must be capable of measuring the hearing frequency ranges of the species of interest. Mice, rats, and most other non-aquatic species used in biomedical research facilities can hear ultrasonic frequencies above the human upper limit of 20 kHz.[14] Therefore, the microphone and related processing equipment in a typical facility with mice should be capable of measuring sounds at least throughout the hearing range of a typical normal hearing mouse, which often extends well into the 80-90 kHz range. Noise levels should be measured and reported as calibrated, unweighted dB sound pressure level (SPL) measurements.

Reporting sound in dB SPL provides an absolute, calibrated sound level referenced to a standard pressure of 20 microPascal, which is generally considered the lowest intensity signal that can be heard (threshold) by a healthy young person (see [17] for a review of sound measurement). This can be accomplished with several methods; the most often used approach is to apply a calibration tone of known pressure of 1 Pascal, which is the pressure equivalent to 94 dB SPL, from an acoustic calibrator that has itself been calibrated within the last 12 months. Most noise meters used by occupational or environmental health & safety offices (e.g., for OSHA-based workplace noise exposure) are designed for measuring sounds audible for humans and are A-weighted, a process that adds gain to some sound frequencies and lowers gain to other sound frequencies to fit the sound measurements to a range that is considered to be optimal for human speech. Although A-weighted measures are appropriate (and required) for determining human noise exposure, they are not appropriate for estimating noise exposures of animals. Noise measurements that are relevant for non-human animals remove the A-weighting and collect unweighted measurements (often referred to as Z-weighting, or unweighted).

The processing and analog-to-digital sampling rate of the microphone and meter system must be at least twice the frequency of the signal to be captured, in order to prevent signal loss or aliasing (Nyquist-Shannon Sampling Theorem;[9]). That is, in order to measure a 96,000 Hz sound, one needs both a microphone with a flat response profile up to this frequency and a digitizer capable of digitally sampling the analog signal at a rate of at least 192,000 Hz (96,000×2). Additional information on comparative hearing across species can be found in Heffner & Heffner,[14] and a referenced listing of detailed hearing ranges of different species is maintained at www.laboratoryforcomparativehearing.com.

Measurements of noise in the cage (microenvironment) should be taken to best simulate the experience the animals, at the approximate head height of the animal and with bedding and any other elements typically present in the cage (enrichment, food, water bottle). The presence of bedding and other items better simulates the normal experience of the animal in the cage by providing similar sound absorption and reverberation features. In our experience, and consistent with the physics of sound, the presence of food and bedding serve to lower noise reverberation and the levels of noise in the animal cage, so measurement taken without bedding or food, as an example, can provide intensity readings that can be louder than they really are for animals housed in bedded cages.

Vibration, as with noise, should be measured in both the macroenvironment (e.g., floor, wall, rack) and the microenvironment (inside cages). Microenvironment vibration measurements inside the cage should be collected with normal bedding, enrichment items, and food in place to better simulate the real experience of the animal but also because such items add more mass to the cage, which depending on the bedding type and thickness, can also help to limit/absorb some of the vibration (and noise). Vibration should be measured from the bottom middle of the cage surface itself, as species like mice and rats often burrow down into the bedding material such that their bodies directly contact the cage. In addition, vibration can occur in the x, y, or z axes. Some prefer to measure all 3 axes while others prefer to measure just the vertical (z) axis, or the greatest of the three. Our experience is that the greatest vibration in animal facilities tends to occur in the vertical z axis under normal circumstances.

Many building/architectural engineers report vibration in terms of length of displacement of a structure, as in meters (m; how far the object moves), or in speed of movement of a structure, as in m/s (how fast the object moves). Vibration acceleration is change in velocity, represented in m/s/s ($M/s^2$) or in the equivalent g (gravitational acceleration). The m/s/s metric is more commonly used in countries using the metric system and g is more commonly used in the United States. However, 1 g of gravitational acceleration is =9.81 $m/s^2$, making conversion estimates easy to accomplish by using a multiplier of 10 (within 2% accuracy). As a result, the vibration health literature generally reports findings in $m/s^2$ or g, whether the results are from crash tests, situations like roller coasters or space flight, or studies on the effects of concussion in football, the effects of vibration on workers using heavy equipment, or the effects of vibration on research animals. We recommend use of RMS (root mean square) as it is a commonly used standard in vibration measurement. Vibration accelerations can also be measured as peak level or peak-to-peak levels, but which type is used should be note as conversions between the three can be easily estimated. RMS is the most commonly used standard in vibration acceleration measurement because it accurately measures a time-varying phenomenon with positively and negatively moving waves, as is found in vibration. RMS is also used in sound measurement but it is typically not designated in the label as the dB SPL computation implies/requires use of RMS data for its calculation.

As with sound, measurements of vibration must capture the relevant frequency content that is perceptible by that particular species. Fortunately, commonly used research species generally have a vibration perception range that is quite similar to that of humans, and most off-the-shelf accelerometers easily accommodate this range. Vibration should minimally include the range of frequencies detectable by research animals (Hz=number of cycles or oscillations per second.) Just as with musical instruments (e.g., violin vs cello vs base), species with different body sizes will vibrate maximally within different frequency ranges. This is known as the resonance frequency range. For mice, the body cavity vibrates optimally between ~30-100 Hz[37] and mice appear to be most impacted by frequencies in the 70-100 Hz range,[41] and as the species' body gets progressively larger (for example, from rat to eat to human), the resonant frequency range adjusts down accordingly. However, different species appear to show substantial overlap in touch perception sensitivity, as skin touch mechanoreceptors, whether they are in the foot pads of mice or on the skin surface of a human, show similar features. Therefore, vibration measurement devices that include frequencies down to approximately 2 Hz and up to at least 500 Hz should be more than adequate for most species used in research. Nevertheless, just as different frequencies of sounds might have different behavioral or ecological significance to a species, different frequencies of vibration might also have differential effects.[11] And it would be expected that vibration frequencies that overlap most with a species resonance frequency range would be most harmful to them. For a particularly thorough, recent review of these and related vibration effects on research animals see Reynolds et. al.[41]

Note that the recommended overall levels of noise and vibration proposed here focus on maintaining levels below certain key intensity thresholds, within the perceptible frequency range of the species being studied. While it is likely that different frequencies of sound and different frequencies of vibration could have differential impacts on animals, adding such frequency-dependent qualifiers or some form of complicated frequency weighting system to the levels proposed here would unnecessarily complicate the recommendations and their implementation. Indeed, the field of human noise exposure, where there is much more research literature, follows a similar principle. While different frequencies of sound have different auditory and non-auditory impacts on humans, standards set for human occupational settings still limit overall average noise levels for an 8-hr workday to 85 dBA and the WHO[53] still argues for 45 dBA being a threshold of concern for sleep disruption and increased risk of health concerns. While the current recommended levels of noise and vibration focus on intensity within the perceptible frequency range of that particular species, it should not be assumed that all sound or vibration frequencies would have the same impact on lab animals. However, building such qualifiers or complicated weighting systems into recommended levels would only serve to obscure the goals of measuring and limiting unnecessary noise and vibration exposure, and would severely hamper implementation of reasonable measurement practices. However, these recommended levels should also be considered a minimum conservative standard and it is possible that much lower levels, or a frequency-dependent version of such levels, would best serve a particular site/program. And it is expected that with more widespread measurement practices, additional research will necessarily follow that will further refine the conservative levels proposed here.

The species environment measurement system shall also be referred to as a vivarium measurement system. Now referring to FIG. 1, a vivarium measurement system 10 is illustrated that includes a study animal 12 and a cage 14. The vivarium measurement system 10 includes a microphone system 16 that includes at least one microphone 18 that acts as a noise sensor. The at least one microphone 18 is preferably placed in the cage 14 but may optionally be placed outside of the cage 14 in a first room 20 (see FIG. 6). The first room 20 is preferably the room where the cage 14 is located where the at least one microphone 18 may be place on top of the cage 14 or on the side of the cage 14 or on a wall (not shown) in the first room 20. These locations are illustrative but not the only places in the first room 20 where the at least one microphone 18 may be placed. The first room 20 may also be a hallway adjacent to the room where the cage 14 is located. The microphone system 16 may also comprise of a plurality of microphones 18. In this instance where a plurality of microphones 18 are used, a first microphone 22 in the first room 20 and a second microphone 24 located in a second room 26. The second room is preferably located adjacent to the first room but may optionally be located in multiple rooms adjacent to each other or in nearby rooms that are separated by one or more rooms.

The vivarium measurement system 10 further includes at least one accelerometer 28 that serves as a vibration sensor in operational relationship to the microphone system 16. The at least one accelerometer 28 is preferably placed in the cage 14 proximate to the study animal 12 but may optionally be placed outside of the cage 14 in the first room 20 (see FIG. 6) in a similar manner in which the at least one microphone 18 is placed. In the instance where a plurality of accelerometers 28 is used, a first accelerometer 30 is located in the first room 20 and a second accelerometer 32 is located in the second room 26. The second room is preferably located adjacent to the first room but may optionally be located in multiple rooms adjacent to each other or in nearby rooms that are separated by one or more rooms. The second room may contain an animal or be an adjacent hallway or office.

In an optional embodiment, the vivarium measurement system 10 may include an at least one hygrometer 34 to serve as a humidity sensor in operational relationship to the microphone system 16. Furthermore, in the optional embodiment, the vivarium system 10 may include an at least one thermometer 36 to serve as a temperature sensor in operational relationship to the microphone system 16. Moreover, in the optional embodiment, the vivarium system 10 may include an at least one lux meter 38 to serve as a light sensor in operational relationship to the microphone system 16. As such, the optional embodiment of the vivarium measurement system 10 contains a microphone system 16 and an at least one accelerometer 30 and a combination of one or more of the following: at least one hygrometer 34, at least one thermometer 36 and at least one light meter 38.

Collectively, the microphone system 16, the at least one accelerometer 28, the at least one thermometer 36 and the at least one light meter 38 by itself or in combination with one or more will be referred to as the measurement device or measurement devices. As reported previously, these measurement devices may reside in or outside the cage or in another room; however, these measurement devices should be placed in a manner where the measurement device disturb the animal or may be disturbed or chewed on by the animal. To assist with the management of data coming from the measurement devices, a data computational device that inputs data from the microphone system 16, the at least on accelerometer 28, the at least one hygrometer 34, the at least one thermometer 36, and the at least one light meter 38 is provided. The data computational device 40 includes a means of logging data and a spectrum analyzer. The data computational device 40 inputs data from the measurement devices at preset time intervals, typically between 0.001 seconds and 10 seconds. A spectrum analyzer reviews the data as it is collected. Threshold parameters are set for the temperature, humidity, light, noise and vibration. If the threshold parameter is exceeded by going below or above the threshold parameter, an at least one alarm system is triggered that relays an alert or alarm. Additionally, the alarms can be conditional upon one another such that alarms are only sent if multiple alarms or triggered and/or are temporally connected to one another in a particular pattern. For example, light level changes suggesting a person is present might negate alarms, or alarms from noise are only sent if and when alarms are also triggered for vibration as well. Similarly, multiple systems can be chained together such that temporal sequence of actions throughout a facility can trigger an alarm, suggesting facility wide vs local in-room effects.

Figure 4A:
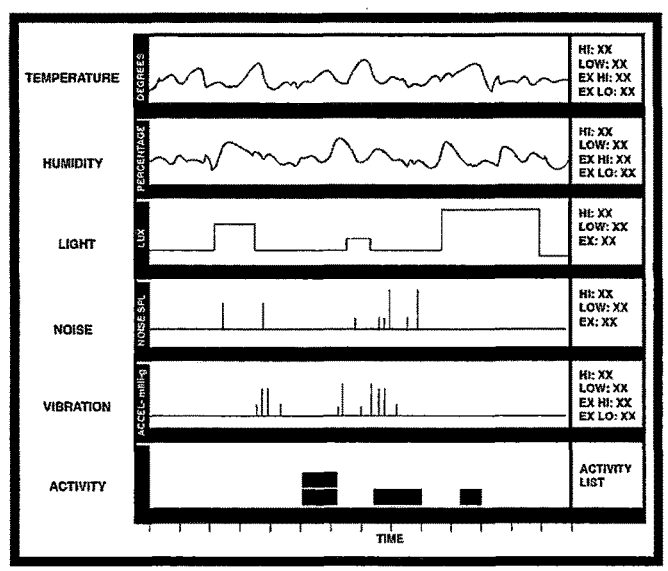
FIG. 4a is an illustration of the logging mechanism of information compiled by a central processing unit (CPU) as data are captured in real time and values are stored and displayed. This
Figure 4B:
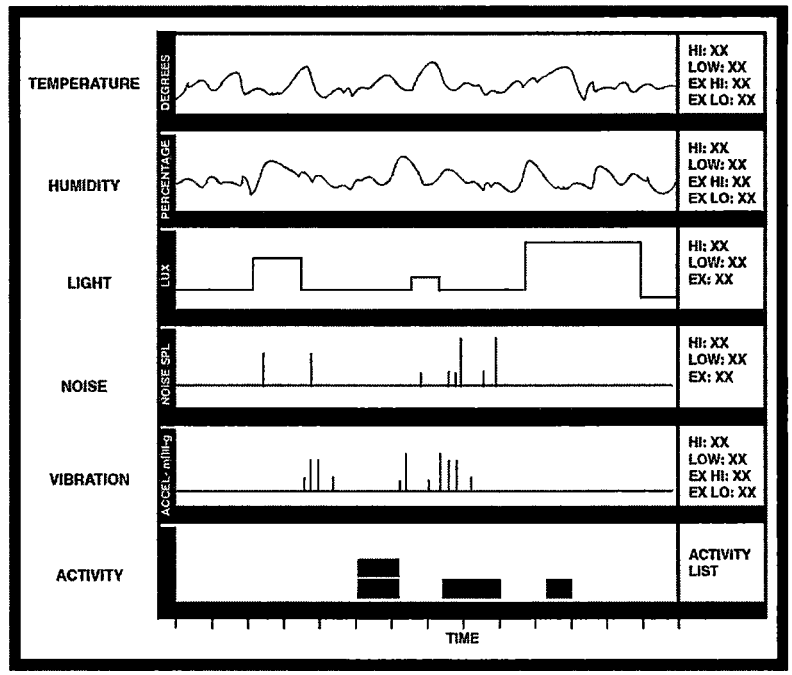
FIG. 4b is another illustration of the logging mechanism of information compiled by a central processing unit (CPU) as data are captured in real time and values are stored and displayed. This

The spectrum analyzer is illustrated in FIGS. 4a and 4b. FIG. 4a shows an actual spectrum analyzer working in real time and FIG. 4b is an illustrative example of the spectrum analyzer. FIG. 4b attempts to more clearly show that dotted lines may be employed to represent the threshold values inputted by the user. In the illustrative example, an upper and lower level observed for temperature is 73.5 and 72.5 degrees Fahrenheit respectively as indicated in the right box and plotted by the solid line; however the upper threshold alert is set at 78 degrees Fahrenheit and the lower threshold alert is set at 50 degrees Fahrenheit as represented by the dotted line. Furthermore in the illustrative example, an upper and lower level observed for humidity is 47.3% and 43.8% (alert thresholds are set at 90% and 20%). Moreover in the illustrative example, an upper and lower level observed for light is set at 317.1 and 199.9 Lux (alert thresholds set at 300 Lux). Additionally in the illustrative example, an upper and lower level observed for noise is 83.2 dB SPL and 49.1 dB SPL (alert threshold set at 80 dB SPL). And lastly in the illustrative example, an upper and lower level observed for vibration is 74.20 and 0.08 milli-g (alert threshold set at 25 milli-g).

Figure 7:
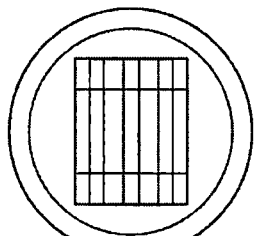
FIG. 7 illustrates an activities screen used to select and update an activity log tracker and shows examples of activities such as cage cleaning, weaning, feeding, procedures and others.
Figure 7:
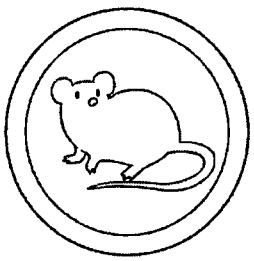
Figure 7:
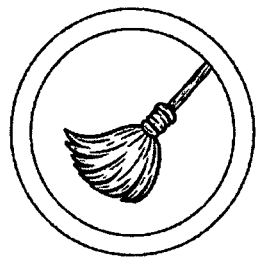
Figure 7:
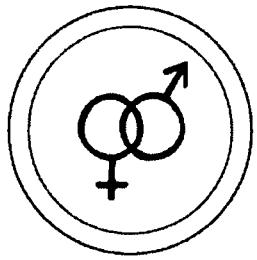
Figure 7:
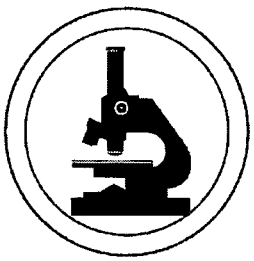
Figure 7:
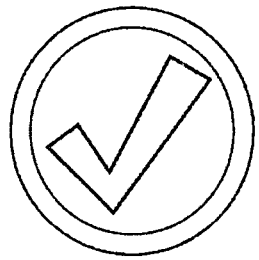

Now referring to FIG. 7, an activity log tracker is used to correspond with the data computational device and is used to keep track of expected disturbances is also optionally provided to track when routine care or other activity is expected in the first room 20. Such activity might include cage cleaning, food or water refills, animal treatment, cage changes, and other expected activity. The activity is inserted before the time is recorded so if an operator expects to clean a cage, he can insert the time he intends to enter the room and record when he exists the room. If an event disturbance is an expected disturbance and occurs in the first room, and the event disturbance coincides with an exceedance of a threshold parameter, an alert may be muted by the spectrum analyzer. The same may occur if the event disturbance occurs in the second room and the event disturbance coincides with an exceedance of a threshold parameter, the alert may be muted by the spectrum analyzer. The activity log tracker is thus used to help prevent unnecessary alerts or alarms from being generated.

Figure 6:
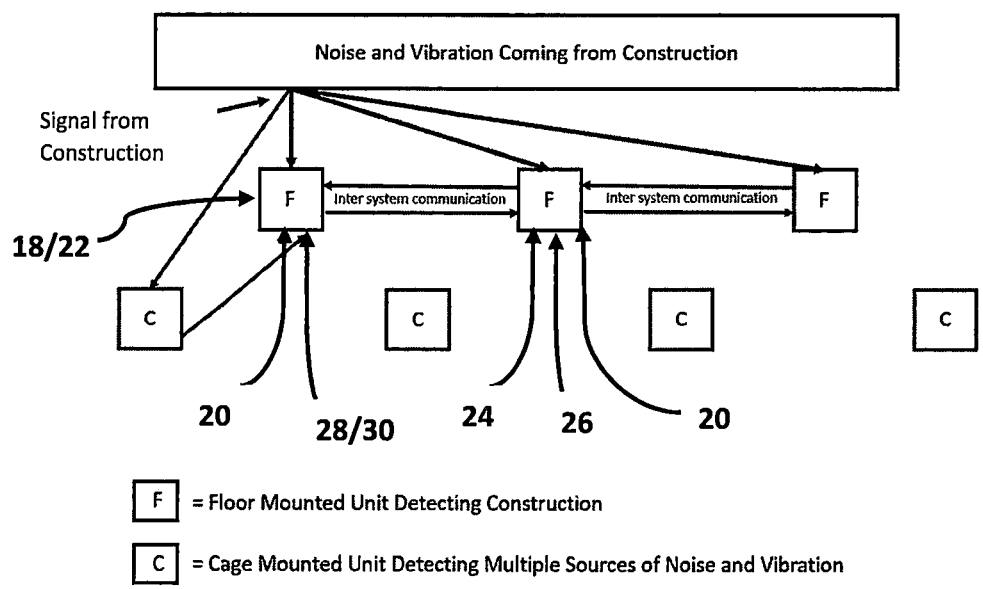
FIG. 6 represents an illustration of a deployed vivarium measurement system in a vivarium with multiple rooms.

This activity can help in deducing if the source of the noise and the vibration are coming from outside the vivarium as shown in FIG. 6. In this embodiment, a plurality of microphones 18 and a plurality of accelerometers 28 are used. A cage mounted unit of a microphone or accelerometer detects a disturbance that exceeds a preset threshold. This result can be compared with the results of a second cage mounted unit of a microphone or accelerometer and can further be compared with a floor mounted unit of a microphone or accelerometer. One arrangement may be where the first room is an animal cage room and the second room is a non-animal cage room such as a hallway. A second arrangement may be where the first room is an animal cage room and the second room is another animal cage room. The spectrum analyzer allows a user to leverage a multiviewer to quickly observe more than one measurement device in different locations simultaneously or nearly simultaneously. Furthermore, the activity log tracker can assist in the determination if the disturbance is local or external. If it can be deduced that the sound and/or vibration are coming from an external source, then the alarm system can be leveraged to send an alert.

To further flesh out this deduction of noise coming from outside of the vivarium measurement system 10, it is important that the first microphone 22 is placed in a separate room from the second microphone 24. Similarly, to deduce whether vibration is coming from outside of the vivarium measurement system 10, it is important that the first accelerometer 30 is in a separate room from the second accelerometer 32. First, it is preferred that when a threshold parameter is exceeded to warrant a comparative analysis by the data computational device 40 of either noise or vibration. When a first microphone result of the first microphone 22 is compared to a second microphone result of the second microphone 24 by the data computational device 40, a comparison is made to create a noise source determination output within the data computational device 40. The data computational device 40 correlates the first noise result of the first microphone 22 to the second microphone result of the second microphone 24 and when no correlation is detected, a noise source determination output is made that noise is coming from outside of the vivarium measurement system 10 and an outside disturbance alert is generated. When a first accelerometer result of the first accelerometer 30 is compared to a second accelerometer result of the second accelerometer 32 by the data computational device 40, a comparison is made to create a vibration source determination output within the data computational device 40. The data computational device 40 correlates the first accelerometer result of the first accelerometer 30 to the second accelerometer result of the second accelerometer 32 and when no correlation is detected, a vibration source determination output is made that vibration is coming from outside of the vivarium measurement system 10 and an outside disturbance alert is generated. The outside disturbance alert tells an operator that the noise or vibration is likely from an outside source such as construction.

Figure 3:
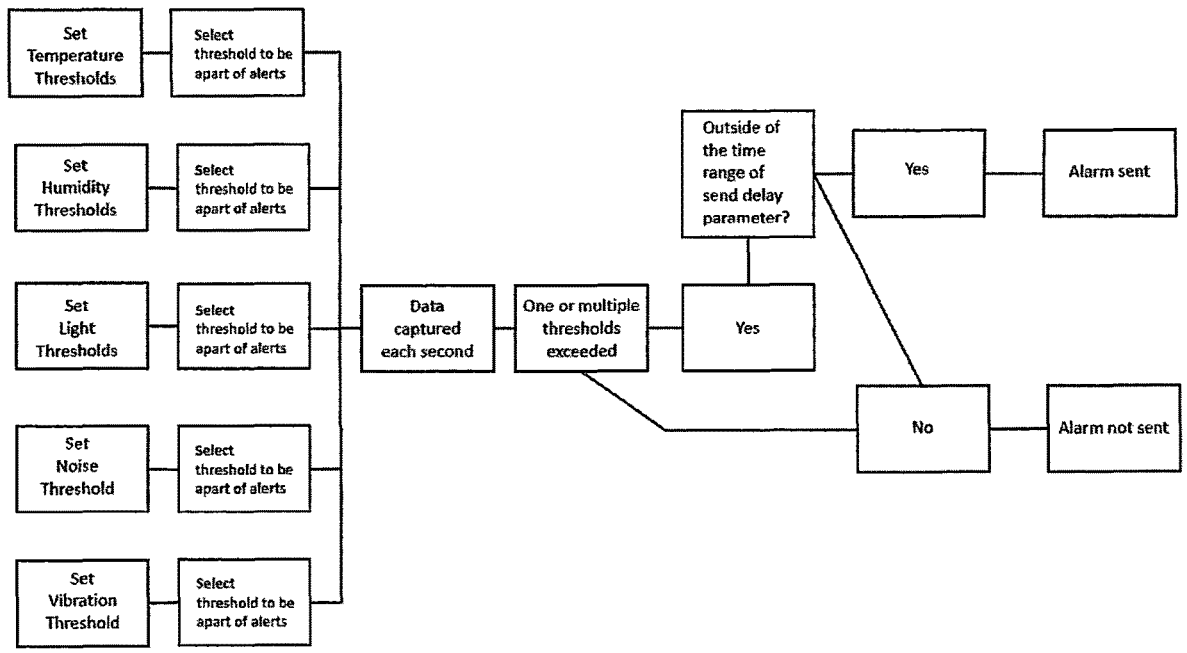
FIG. 3 is an alert logic tree that illustrates how data are captured and analyzed for alarm determination in one embodiment of the present invention.

Now referring to FIG. 3, the next aspect of the present invention is to include an alarm system that corresponds with the monitoring system. The alarm system is preferably present to alert a user when thresholds are breached and potential harm or distress may occur with the animal. A threshold being breached is referred to as a disturbance. Such an alarm may be produced in real time to give animal care givers an opportunity to correct the concern before the concern becomes detrimental to the experiment or worse, to the animal itself. Furthermore, alarms can be recorded to give investigators an opportunity to explain any anomalies in the data. Temperature, light and humidity threshold levels are set dependent upon the experiments or other study that is intended for the animal. It is noted that some animals are purposely exposed to environments that reflect a condition that the animal is expected to be exposed to, such as 18 hours of light versus 8 hours of light. Conservative values are typically used to maximize the comfort of the animal which more accurately simulate standard conditions.

Figure 5A:
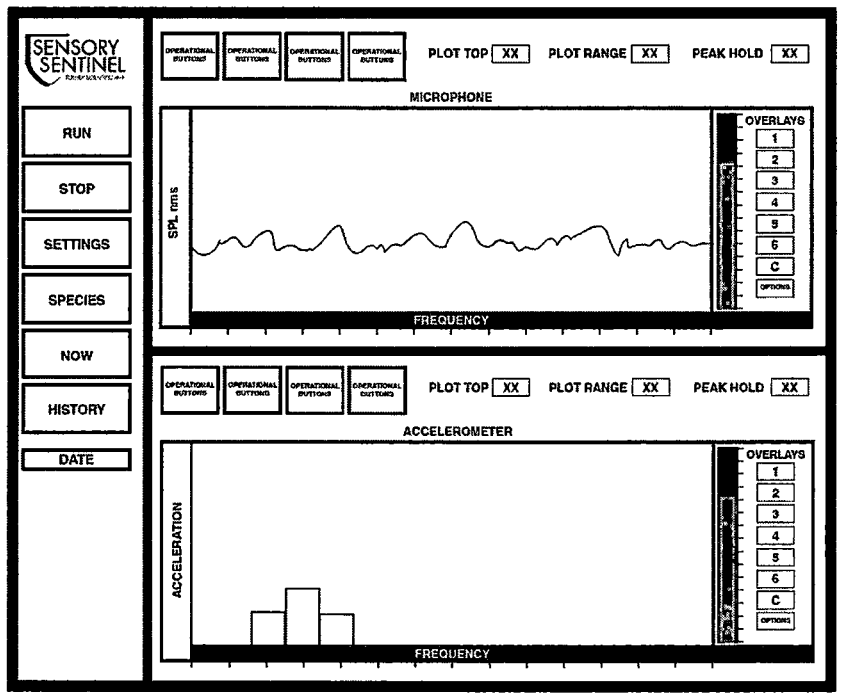
FIG. 5a is an example of a spectrum analyzer and in the present instance, illustrates a frequency analyzer that analyzes a spectrum of frequencies experienced within a space. This
Figure 5B:
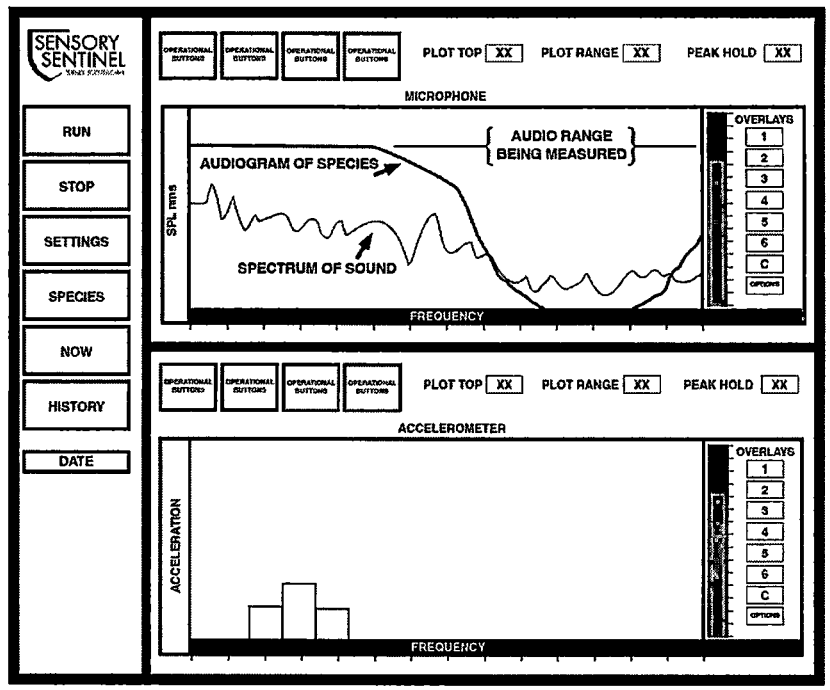
FIG. 5b is an example of a spectrum analyzer and in the present instance, illustrates a frequency analyzer that analyzes a spectrum of frequencies experienced within a space. This

Sound exposure thresholds are very animal dependent as the frequencies and decibel levels vary in what might be deemed stressful to a given species. As such, a frequency range must be monitored to determine if a decibel noise can be heard by the animal. Now referring to FIGS. 5a and 5b, FIG. 5a illustrates an actual audiogram and sound spectrum analyzer and FIG. 5b illustrates in a more general manner on how the audiogram works. Generally, animals can only hear certain frequencies and thus, the decibel level of sound is only captured if the sound falls within the animal's frequency spectrum. Some examples of an animal's frequency spectrum include the following (measured in Hz): Cat 45—91,000, Chicken 2—8,000, Dog 50—50,000, Domestic Cattle 17—40,000, Guinea Pig 54—50,000, Hamster 31—50,000, Human 16—20,000, Mouse 900—96,000, Owl Monkey 63—64,000, Pig 32—45,000, Rabbit 63—50,000, Rat 250—96,000, Rhesus Macaque 125—45,000, Sheep 100—40,000 and Squirrel Monkey 125—42,000. The sound generated should be within these ranges for it to be recorded on the spectrum analyzer and if it is, the decibel level of that sound is recorded at that instance (or second).

Mice noise exposure should not exceed 85 dB SPL. To help set a threshold value for mice under standard conditions, a reasonable noise threshold setting would be not to exceed 70 dB for extended periods and not to exceed 100 dB ever. Under this scenario, multiple levels of alert may be generated such as a green line for data below 70 dB, yellow for data between 70 dB and 100 dB, and red for data over 100 dB. An Alert Logic Tree in FIG. 3 explains how the data is collected from the measurement devices and a determination is made each second whether a threshold value has been exceeded. If no threshold values have been exceeded, then no alarm is sent. If one has been exceeded, a determination is made if the threshold has been exceeded outside of the time range (such as when the activity log tracker has been prepopulated with an expected disturbance). If the threshold has been exceeded outside of the time range, an alert is not sent. If the threshold has been exceeded within the time range, an alert is sent.

Acute noise and chronic noise alerts might also be different. Acute noise is the noise that is heard at a given instance and just one instance above a threshold level would trigger an alert. This may be called an acute threshold level. However, if a chronic threshold level is exceeded, which is typically below the acute threshold level, an alert (referred to as the chronic sound alert) may not be triggered until a predetermined period of time above that chronic threshold level is exceeded (referred to as the chronic period). Different parameters may be set to trigger a chronic sound alert. For instance, if the decibel sound dips just below the chronic threshold level for one second, this should not negate the entire chronic period and have the chronic period start all over again. Instead, a percentage of the chronic period may be negated or ignored altogether depending on the study parameters.

In practice, a user or operator of the vivarium measurement system 10 sets parameters to signal a disturbance to determine if the disturbance might influence a study or behavior. The user would input an upper threshold parameter in a data computational device 40 for either temperature, humidity, light, sound or vibration data to be captured by a first measurement device. A recording of the first measurement device would begin by the data computational device 40 of the temperature, humidity, light, sound or vibration. When the upper threshold parameter is exceeded by one of these inputs, that instance is captured and analyzed by comparing the instance when the level of temperature, humidity, light, sound or vibration correlates to an expected disturbance in the activity log tracker. An alert is sent when the instance of temperature, humidity, light, sound or vibration exceeds the upper threshold parameter and the instance does not coincide with an expected disturbance. This review may be modified if there is a chronic threshold that needs to be analyzed and warrants a longer period than an instance to trigger an alert being sent. In this event, the user would input a chronic threshold limit of temperature, light, humidity, sound or vibration and a chronic period of time. An alert would only be sent when a period of multiple instances are captured where the temperature, light, humidity, vibration or sound level exceeds the chronic threshold limit and the period of multiple instances exceed said chronic period of time.

One or more different mechanisms of sending data collected from the measurement devices to the data computational device 40 may be employed. The data may be send via a wired transmission; however, this might not be practical if measurement devices are employed in multiple rooms. As such, it may be preferred to send this data wirelessly via wifi, Bluetooth, or some other wireless technology.

The computational device 40 is preferably a CPU, smartphone or tablet; however, a programming platform that compiles the data can be modified to leverage multiple CPUs, smartphones or tablets. In this manner, data may be integrated from multiple systems and ran through an algorithm to send "smart" alerts using cross-correlation data between rooms. Leveraging this mechanism, smart alarms may be sent that minimize nuisance alarms. In one example, the user of the vivarium measurement system 10 can pull in an image of their animal facility blueprints and drop data into different rooms which automatically computes real-time levels and time-synced and correlated events throughout the facility with one dashboard. This type of system highlights how the data from the different measurement devices spread across many rooms can be used to send alerts about problems intelligently.

An example of an alert being triggered is a noise threshold parameter for noise where a microphone upper threshold set for 70 dB. If the noise exceeds 70 dB, an alert in the form of an alarm is sent. The alarm may alert an operator with a noise, a light, a sound, an email or a pop-up screen on the spectrum analyzer. However, it is noted that the upper threshold may also include a value between 65 dB and 100 dB depending on the study and the species. Another example of an alert being triggered is when a vibration threshold parameter for vibration where a vibration upper threshold is set for 0.05 g. If the vibration exceeds 0.05 g, an alert in the form of an alarm is sent. However, it is noted that the upper threshold may also include a vibration upper threshold set for a value between 0.01 g to 0.15 g Various alarm systems may be employed. Pop-up notification on a computer screen, text alerts, sounds alarms, light alarms, color coded alarms on the display screen and email alerts are just a few examples. In the present invention, the alarm system uses a combination of pop-up alerts and phone notifications if preselected thresholds have been breached. A report may be generated to tell an operator or animal care person when and how long the exposure to the harmful insult occurred. Other alerts can be employed depending on user preference.

While a particular embodiment of the vivarium measurement system has been described herein, it will be appreciated by those skilled in the art that changes and modifications may be made thereto without departing from the invention in its broader aspects and as set forth herein.

REFERENCES

1. Arlizumi M, Okada A. 1983. Effect of whole body vibration on the rat brain content of serotonin and plasma corticosterone. European journal of applied physiology and occupational physiology, 52(1): 15-19.
2. Atanasov N A, Sargent J L, Parmigiani J P, Palme R. Diggs H E. 2015. Characterization of train-induced vibration and its effect on fecal corticosterone metabolites in mice. Journal of the American Association for Laboratory Animal Science, 54(6): 737-744.
3. Attarha M, Bigelow J, Merzenich M. 2018. Unintended consequences of white noise therapy for tinnitus—Otolaryngology's Cobra Effect. JAMA Otolaryngology Head & Neck Surgery, 144(10): 938-943.
4. Babisch W. 2003. Stress hormones in the research in cardiovascular effects of noise. Noise Health. 5: 1-11.
5. Berglund B, Lindvall T, Schwela D H 1999. WHO Guidelines for Community Noise. Available: http://whqlibdoc.who.int/hq/1999/a68672.pdf accessed Nov. 11, 2018.
6. Chang E F, Merzenick M M. 2003. Environmental noise retards auditory cortical development. *Science*. 300: 498-502.
7. Cheng L, Wang S H, Chen Q C, Liao X M. 2011. Moderate noise induced cognition impairment and its underlying mechanisms. Physiology & Behavior. 104: 981-988.
8. Cui B, Wu M, She X. 2009. Effects of chronic noise exposure on spatial learning and memory of rats in relation to neurotransmitters and NMDAR2B alteration in the hippocampus. Journal of Occupational Health. 51: 152-158.
9. Davis M F. 2007. Audio and Electroacoustics. In Handbook of Acoustics. T. D. Rossing, Ed. pp 743-778.
10. Gannouni N, Mhamdi A, Tebourbi O, El May M, Sakly M, Rhouma K B. 2013. Qualitative and quantitative assessment of noise at moderate intensities on extra-auditory system in adult rats. Noise Health. 15: 406-411.
11. Garner A M, Norton J N, Kinard W L, Kissling G E, Reynolds, R P. 2018. Vibration-induced behavioral responses and response thresholds in female C57BL/6 mice. Journal of the American Association for Laboratory Animal Science, 57(5), 447-455.
12. Grimsley J M S, Sheth S, Vallabh N, Grimsley C A, Bhattal J, Latsko M, Jasnow A, Wenstrup J J. 2016. Contextual modulation of vocal behavior in mouse: Newly identified 12 kHz "Mid-Frequency" vocalization emitted during restraint. Frontiers of Behavioral Neuroscience. 10, 38.
13. Harding G W, Bohne B A. 2004. Temporary DPOAE level shifts, ABR threshold shifts and histopathological damage following below-critical-level noise exposures. Hear Res. 196, 94-108.
14. Heffner H E, Heffner R S. 2007. Hearing ranges of laboratory animals. Journal of the American Association for Laboratory Animal Science: JAALAS, 46(1), 20-22.
15. Heinrich R R, Brieger J, Silvanova O, Feltens R, Ehnemacher A, Schafer D, Mann W J. 2006. COX-2 expression in the guinea pig cochlea partly altered by moderate sound exposure. Neuroscience Letters. 394(2), 121-6.
16. Hogan M C, Norton J N, Reynolds R P. 2018. Chapter 20 Environmental Factors: Macroenvironment versus Microenvironment. In Management of Animal Care and Use Programs in Research, Education, and Testing. $2^{nd}$ Ed. Authors Weichbrod, R H, Thompson, G A H, and Norton, J N, Eds. CRC Press/Taylor & Francis.
17. Hughes L. 2007. The fundamentals of sound and its measurement. Journal of the American Association for Laboratory Animal Science. 46 (1). 14-19.
18. Hurst K. Litwak K N. 2012. Accelerative forces associated with routine in-house transportation of rodent cages. Journal of the American Association for Laboratory Animal Science: JAALAS, 51(5), 544.
19. International Organization for Standardization (ISO) 1997. Guide to the evaluation of human exposure to whole-body mechanical vibration and shock. ISO 2631-1:1997.
20. Ison J R, Allen P D. 2003. Low-frequency tone pips elicit exaggerated startle reflexes in C57BL/6J mice with hearing loss. *Journal of the Association for Research in Otolaryngology*, 4(4), 495-504.
21. Kobrina A, Teal K L, Dent M L. 2018. Intensity difference limens in adult CBA/CaJ mice (*Mus musculus*). Behav Processes, 148, 46-48.
22. Lauer A M, May B J, Hao Z Y, Watson J. 2009. Analysis of environmental sound levels in modern rodent housing rooms. Lab Animal, 38(5), 154-160.
23. Li Y, Rabey K N, Schmitt D, Norton J N, Reynolds R P. 2015. Characteristics of vibration that alter cardiovascular parameters in mice. Journal of the American Association for Laboratory Animal Science: JAALAS, 54(4), 372.
24. Logge W, Kingham J, Karl T. 2014. Do individually ventilated cage systems generate a problem for genetic mouse model research? Genes, Brain and Behavior, 13(7), 713-720.
25. Morioka M, Griffin M J. 2000. Difference thresholds for intensity perception of whole-body vertical vibration:

effect of frequency and magnitude. Journal of the Acoustical Society of America, 107, 620-624.
26. Murphy T J, Rienstra A A. 2012. Hear More: A Guide to Using Ultrasound for Leak Detection and Condition Monitoring. Terence O'Hanlon Publishers. ISBN 978-0-9825-1633-1.
27. National Institutes of Health Design Requirements Manual 2016. Issuance Notice Dec. 12, 2016) Rev. 1.0: 0213/2018 Accessed Nov. 18, 2018: https://www.wbdg.org/FFC/NIH/nih_design_requirements_rev_1.0_2018.pdf
28. National Research Council (NRC). 2011. *Guide for the Care and Use of Laboratory Animals: Eighth Edition*. Washington, D.C.: The National Academies Press. doi: 10.17226/12910.
29. Norton J N, Kinard W L, Reynolds R P. 2011. Comparative vibration levels perceived among species in a laboratory animal facility. Journal of the American Association for Laboratory Animal Science, 50(5), 653-659.
30. Obernier J A, Baldwin R L. 2006. Establishing an appropriate period of acclimatization following transportation of laboratory animals. ILAR journal, 47(4), 364-369.
31. Perremans S, Randall J M, Rombouts G, Decuypere E, Geers, R. 2001. Effect of whole-body vibration in the vertical axis on cortisol and adrenocorticotropic hormone levels in piglets. Journal of animal science, 79(4), 975-981.
32. Pienkowski M, Eggermont J J. 2012. Reversible long-term changes in auditory processing in mature auditory cortex in the absence of hearing loss induced by passive moderate-level sound exposure. Ear & Hearing. 33(3), 305-314.
33. Pienkowski M, Munguia R, Eggermont J J. 2013. Effects of passive, moderate-level sound exposure on the mature auditory cortex: spectral edges, spectrotemporal density, and real-world noise. Hearing Research, 296, 121-30.
34. Popelar J, Diaz Gomez M, Lindovsky J, Rybalko N, Burianova J, Oohashi T, Syka J. 2017. The absence of brain-specific link protein Bral2 in perineuronal nets hampers auditory temporal resolution and neural adaptation in mice. Physiological Research, 66(5), 867-880.
35. Portfors C V, Perkel D J. (2014). The role of ultrasonic vocalizations in mouse communication. Current Opinions in Neurobiology, 28, 115-120.
36. Rabat A. 2007. Extra-auditory effects of noise in laboratory animals: The relationship between noise and sleep. JAALAS. 46, 35-41.
37. Rabey K N, Li Y, Norton J N, Reynolds R P, Schmitt D. 2015. Vibrating frequency thresholds in mice and rats: implications for the effects of vibrations on animal health. Annals of biomedical engineering. 43(8), 1957-1964.
38. Raff H, Bruder E D, Cullinan W E, Ziegler D R, Cohen E P. 2011. Effect of animal facility construction on basal hypothalamic-pituitary-adrenal and renin-aldosterone activity in the rat. Endocrinology, 152(4), 1218-1221.
39. Rassmussen S, Glickman G, Norinsky R, Quimby F W, Tolwani R J. 2009. Construction noise decreases reproductive efficiency in mice. J Am Assoc Lab Anim Sci, 48(4), 363-370.
40. Reynolds R P, Kinard W L, Degraff J J, Leverage N, Norton J N. 2010. Noise in a laboratory animal facility from the human and mouse perspectives. J Am Assoc Lab Anim Sci, 49(5), 592-597.
41. Reynolds R P, Li Y, Garner A, Norton J N. 2018. Vibration in mice: A review of comparative effects and use in translational research. Animal Model Exp Med, 1(2). 116-124.
42. Sales G D, Wilson K J, Spencer K V, Milligan S R. 1988. Environmental ultrasound in laboratories and animal houses: A possible cause for concern in the welfare and use of laboratory animals. Lab Animals. 22, 369-375.
43. Samson J, Sheeladdevi R, Ravindran R, Senthilvelan M. 2006. Stress responses in rat brain after different durations of noise exposure. Neuroscience Research. 57, 143-147.
44. Schwarting R K W, Wohr M. 2012. On the relationships between ultrasonic calling and anxiety-related behavior in rats. Brazilian Journal of Medical & Biological Research, 45(4), 337-348.
45. Silva M J, Dias A, Barreta A, Nogueira P J, Castelo-Branco, N. A. A., & Boavida, M. G. 2002. Low frequency noise and whole-body vibration cause increased levels of sister chromatid exchange in splenocytes of exposed mice. Teratogenesis, carcinogenesis, and mutagenesis, 22(3), 195-203.
46. Skellett R A, Crist J R, Fallon M, Bobbin R P. 1996. Chronic low-level noise exposure alters distortion product otoacoustic omissions. Hear Res. 98, 68-76.
47. Smith M G, Croy I, Ögren M, Waye K P. 2013. On the influence of freight trains on humans: a laboratory investigation of the impact of nocturnal low frequency vibration and noise on sleep and heart rate. PloS one, 8(2), e55829.
48. Turner J G, Bauer C A, Rybak L P. 2007. Noise in animal facilities: why it matters. J Am Lab Anim Sci, 46(1), 10-13.
49. Turner J G, Parrish J L, Hughes L F, Toth L A, Caspary D M. 2005. Hearing in laboratory animals: strain differences and nonauditory effects of noise. Comp Med, 55(1). 12-23.
50. Turner J G, Willott J F. 1998. Exposure to an augmented acoustic environment alters auditory function in hearing-impaired DBA/2J mice. Hear Res, 118, 101-113.
51. Turner J G, Parrish J L, Zuiderveld L, Darr S, Hughes L F, Caspary D M, Idrezbegovic F, Canlon B. 2013. Acoustic experience alters the aged auditory system. 34(2), 151-159.
52. U.S. Environmental Protection Agency (EPA). 1974. Information on Levels of Environmental Noise Requisite to Protect Public Health and Welfare with an Adequate Margin of Safety. Available: http://www.nonoise.orgtlibrary/levels74/levels74.htm [accessed 11 Nov. 2018]
53. World Health Organization (WHO). 2018. Environmental noise guidelines for the European Region. ISBN: 9789289053563.
54. Whitmer W M, McShefferty D, Akeroyd M A. (2016). On detectable and meaningful speech-intelligibility benefits. Adv Exp Med Bio. 894, 447-455.

I claim:

1. A method using a vivarium system to determine whether vibration is coming from outside a vivarium, said vivarium system comprises of:
   a microphone system that comprises of a first microphone in a first room and a second microphone located in a second location;
   an at least one accelerometer in operational relationship to said microphone system;
   a data computational device that receives sound and vibration data from said microphone system and said at least one accelerometer and wherein said data computational device comprises of a spectrum analyzer;

an activity log tracker to correspond with said data computational device; and an at least one alarm system that relays an alert from said data computational device to an operator when a threshold parameter is exceeded as determined by said spectrum analyzer, and said method comprises the steps of:

capturing a first accelerometer result of a first accelerometer in said first room when said threshold parameter is exceeded, reviewing whether an event disturbance is logged and expected when said first accelerometer result in said first room exceeds said threshold parameter, and sending an alter to the operator when said first accelerometer result of said first accelerometer in said first room exceeds said threshold parameter and an event disturbance is not expected.

2. A method of sending an alert in a vivarium measurement system to signal a disturbance, said method comprises:

inputting an upper threshold parameter in a data computational device for sound or vibration data captured by a first measurement device, inputting an expected disturbance in said data computational device that is for a disturbance period of time and a disturbance threshold parameter greater than said upper threshold parameter, initiating a recording of sound or vibration captured by said first measurement device, capturing an instance of sound or vibration that exceeds said upper threshold parameter, comparing said instance of sound or vibration that exceeds said upper threshold parameter to an expected disturbance in an activity log tracker, and sending an alert when said instance of sound or vibration exceeds said upper threshold parameter and when said instance of sound or vibration exceeds said expected disturbance for said disturbance period of time or said disturbance threshold parameter.

3. The method of claim 2, further comprising the steps:

inputting a chronic threshold limit in said computational device of sound and a chronic period of time, and sending an alert when the sum of time of multiple instances when the sound is greater than said chronic threshold limit is greater than said chronic period of time.

4. The method of claim 2, further comprising the steps:

inputting a chronic threshold limit in said computational device of vibration and a chronic period of time, and sending an alert when the sum of time of multiple instances when the vibration is greater than said chronic threshold limit is greater than said chronic period of time.

5. The method of claim 2, further comprising the steps:

inputting a chronic threshold limit for sound, inputting a chronic threshold limit for vibration in said computational device, and inputting a chronic period of time, and sending an alert when the sum of time of multiple instances when the vibration recorded is greater than the chronic threshold limit for vibration and the sum of time of multiple instance when the sound recorded is greater than the chronic threshold limit for sound is greater than said chronic period of time.

6. A method using a vivarium system to determine whether vibration is coming from outside a vivarium, said vivarium system comprises of:

a microphone system that comprises of a first microphone in a first room and a second microphone located in a second location;

an at least one accelerometer in operational relationship to said microphone system;

a data computational device that inputs data from said microphone system and said at least on accelerometer and wherein said data computational device comprises of a spectrum analyzer;

an activity log tracker to correspond with said data computational device; and an at least one alarm system that relays an alert when a threshold parameter is exceeded as determined by said spectrum analyzer, and said method comprises the steps of:

capturing a first accelerometer result of a first accelerometer in said first room when said threshold parameter is exceeded, reviewing whether an event disturbance is logged and expected when said first accelerometer result in said first room exceeds said threshold parameter, and sending an alter when said first accelerometer result of said first accelerometer in said first room exceeds said threshold parameter and an event disturbance is not expected.

* * * * *